United States Patent [19]
Morrow

[11] 4,157,613
[45] Jun. 12, 1979

[54] APPARATUS FOR INSERTING A ROTOR INTO A STATOR

[75] Inventor: Gordon F. Morrow, Cheektowaga, N.Y.

[73] Assignee: D. A. Griffin Corp., West Seneca, N.Y.

[21] Appl. No.: 863,917

[22] Filed: Dec. 23, 1977

[51] Int. Cl.² ............................................. H02K 15/16
[52] U.S. Cl. ........................................ 29/732; 29/596; 29/824
[58] Field of Search ................. 29/596, 732, 598, 234, 29/824; 310/42

[56] References Cited

U.S. PATENT DOCUMENTS

| 1,802,870 | 4/1931 | Brown | 29/596 |
| 2,624,473 | 1/1953 | Corder | 29/732 |

Primary Examiner—Carl E. Hall
Attorney, Agent, or Firm—Sommer & Sommer

[57] ABSTRACT

Apparatus is provided for longitudinally inserting a rotor having a shaft into a stator having an opening adapted to receive the rotor. The apparatus includes a stationary support having an elongated cantilevered beam extending horizontally outwardly therefrom, and a pedestal support spaced horizontally from the stationary support. Cradles are provided on the pedestal support and on the distal end of the beam to support the ends of the rotor shaft. A carriage is mounted for movement between the supports in a direction parallel to the longitudinal axis of the beam, and is adapted to support the stator. The carriage has means for selectively adjusting the position of the stator relative to to the supported rotor in multiple directions. The carriage is moved away from the stationary support to cause the stator to envelop the rotor.

11 Claims, 15 Drawing Figures

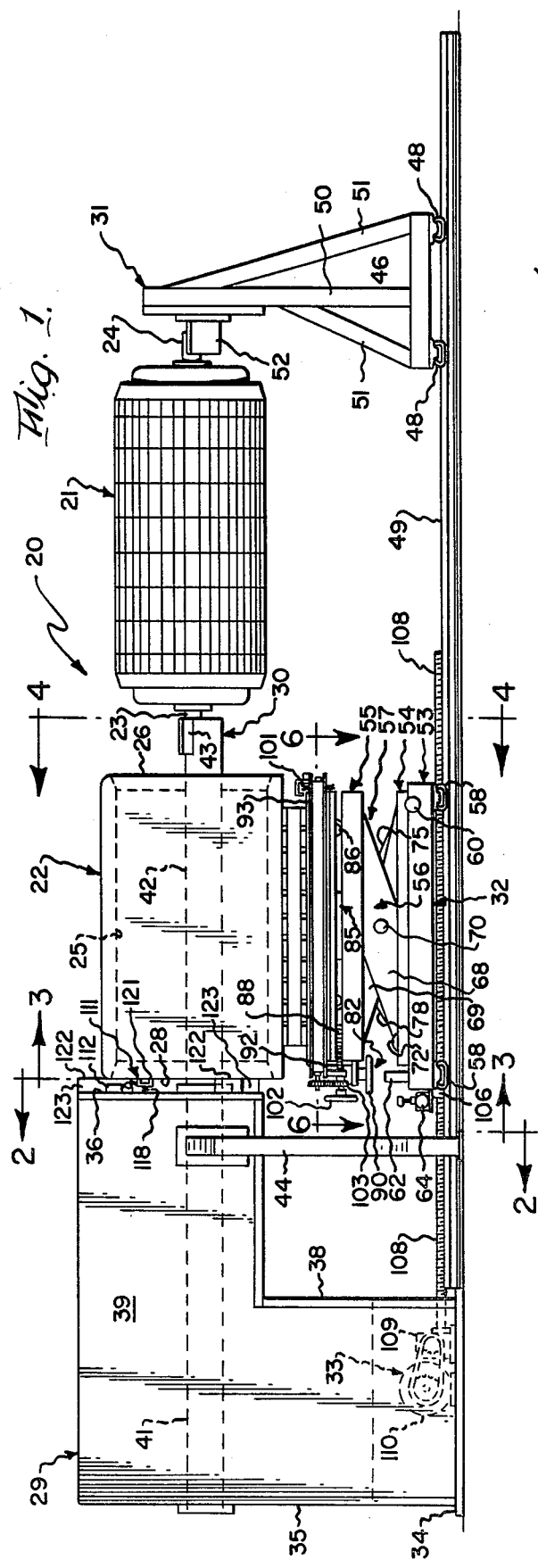

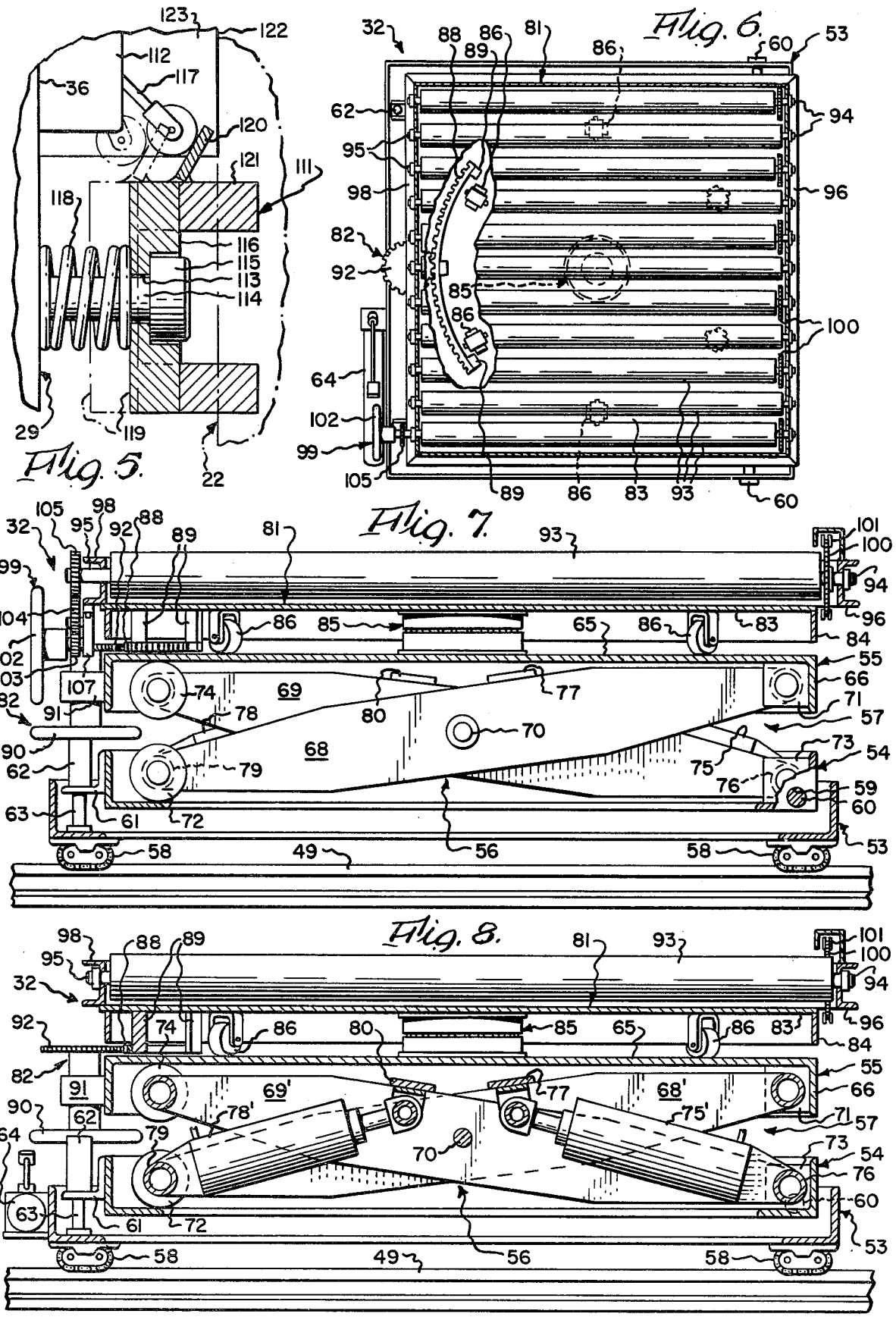

4,157,613

APPARATUS FOR INSERTING A ROTOR INTO A STATOR

BACKGROUND OF THE INVENTION

1. Field of the Invention

The present invention relates generally to apparatus for inserting a rotor into a stator.

2. Description of the Prior Art

In general, an electrical motor includes a rotor positioned within a stator and journalled on a pair of end heads suitably secured to the stator. Upon information and belief, it is common practice to form the rotor and stator as separate subassemblies, and thereafter insert the rotor into the stator. While this may not be particularly difficult in the case of small motors, such insertion poses a difficult problem in the case of large motors wherein the rotor and stator must be handled mechanically. The problem is further complicated by the relatively small radial clearance between the rotor and stator.

SUMMARY OF THE INVENTION

The present invention provides improved apparatus for inserting a rotor having a shaft coaxially into a stator having an opening adapted to receive such insertion of the rotor.

The improved apparatus broadly includes a stationary support having a cantilevered beam extending outwardly therefrom in a horizontal direction, a pedestal support spaced horizontally from the stationary support, and a carriage mounted for selective movement toward and away from the stationary support, and having an adjustable support structure adapted to support the stator such that the beam may penetrate the stator opening. The distal end of the beam and the pedestal support are provided with horizontally aligned cradles arranged to face one another and severally adapted to support a corresponding marginal end portion of the rotor shaft.

In use, the stator is supported on the carriage, and the carriage is moved toward the stationary support such that the beam will penetrate the stator opening with the distal end of the beam exposed therebeyond. Thereafter, the rotor is moved to engage and be supported by the cradles, and the carriage is then moved away from the stationary support while clearance adjustments are made to cause the stator to envelop the rotor.

Preferably, the carriage includes different mechanisms for selectively adjusting the position of the stator with respect to the supported rotor. In the preferred embodiment, the carriage has a lower frame mounted for movement toward and away from the stationary support, and an adjustable structure for supporting the stator and including an inner frame mounted for pivotal movement relative to the lower frame, and adjusting means for effecting such pivotal movement. The support structure further includes a platform, and elevating means operatively interposed between the platform and the inner frame and selectively operable to vary the height of the platform above the inner frame. In the preferred embodiment, a turntable is mounted on this platform, and is arranged to be selectively rotated by a turntable moving means. Also, this turntable may further include a plurality of rollers, and roller moving means operatively engaging these rollers to translate the stator thereacross. Therefore, the carriage of the preferred embodiment has a variety of means for effecting a multiplicity of different or compound movements of the supported stator to align the stator opening with the rotor during movement of the carriage away from the stationary support.

Accordingly, one general object of the present invention is to provide an improved device for inserting a rotor into a stator.

Another object is to provide an improved rotor mounting device wherein a stator is supported on a carriage, and such carriage is capable of producing a multiplicity of individual or compound movements of the stator to align the stator opening with the rotor during the insertion operation.

These and other objects and advantages will become apparent from the foregoing and ongoing specification, the drawings and the appended claims.

BRIEF DESCRIPTION OF THE DRAWINGS

FIG. 1 is a right side elevation of the improved apparatus, showing the stationary and pedestal supports, the carriage supporting the stator, the carriage moving means, and the rotor supported by the cradles on the beam and pedestal support.

FIG. 2 is a transverse vertical sectional view thereof, taken generally on line 2—2 of FIG. 1, showing the stationary support in front elevation and showing the beam in cross-section.

FIG. 3 is a transverse vertical sectional view thereof, taken generally on line 3—3 of FIG. 1, showing the carriage and the stator in rear elevation and showing the beam in cross-section.

FIG. 4 is a transverse vertical sectional view thereof, taken generally on line 4—4 of FIG. 1, this view showing the carriage, the beam, and the stator in front elevation.

FIG. 5 is a greatly enlarged fragmentary longitudinal vertical sectional view thereof, taken generally on line 5—5 of FIG. 2, this view particularly showing the limit switch of the carriage moving means.

FIG. 6 is an enlarged horizontal sectional view thereof, taken generally on line 6—6 of FIG. 1, this view showing the carriage in top plan with portions broken away to reveal the turntable moving means.

FIG. 7 is a greatly enlarged fragmentary longitudinal vertical sectional view of the carriage adjacent its right side, taken generally on line 7—7 of FIG. 3, this view showing the inner frame pivotally mounted on the lower frame, the actuator for tilting the inner frame, the scissors-type elevating mechanism, the platform, the turntable, and the roller moving means.

FIG. 8 is a greatly enlarged fragmentary longitudinal vertical sectional view taken centrally through the carriage on line 8—8 of FIG. 3, this view being generally similar to FIG. 7 but showing the elevating actuators associated with the arms of the scissors-type mechanism, and further showing the turntable moving means.

DESCRIPTION OF THE PREFERRED EMBODIMENTS

Figure 9:
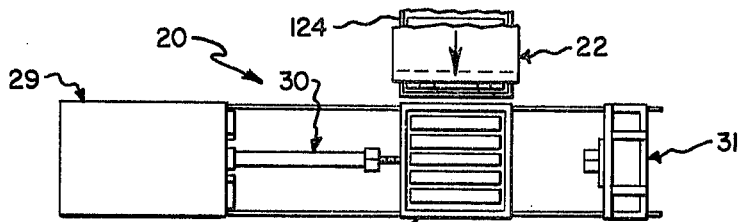
FIG. 9 is a schematic top plan view of the apparatus with the carriage elevated and positioned in line with an upstream conveyor and about to receive a stator delivered by the upstream conveyor.

At the outset, it should be clearly understood that like reference numerals are intended to identify the same elements and/or structure consistently throughout the several drawing figures, as such elements and/or structure may be further described or explained by the entire written specification of which this detailed description is an integral part.

Referring initially to FIG. 1, the present invention provides improved apparatus, of which the presently preferred embodiment is generally indicated at 20, for use in inserting a rotor 21 into a stator 22. In FIG. 1, rotor 21 is shown as typically including an axial shaft having leftward and rightward marginal end portions 23, 24, respectively. The stator is shown as being a horizontally-elongated rectangular block-like member provided with a large diameter cylindrical through-opening 25 communicating its front and rear planar surfaces 26, 28. The rotor is adapted to be inserted into this stator opening. Once so inserted, the rotor shaft is journalled on a pair of end heads (not shown) suitably secured to the stator.

Still referring principally to FIG. 1, the preferred embodiment of apparatus 20 is shown as broadly including a left stationary support 29 having a beam 30, a right pedestal support 31 spaced horizontally from the stationary support, a carriage 32 mounted for movement between the supports, and carriage moving means 33 operatively arranged to selectively move carriage 32 either toward or away from the stationary support.

As best shown in FIGS. 1 and 2, the stationary support 29 is a transversely-thickened inverted substantially L-shaped member having a lower horizontal base plate 34 resting on a suitable foundation or support; a rectangular vertical back plate 35; rectangular upper and lower front plates 36 and 38, respectively; and left and right vertical side plates 39 and 40, respectively. Beam 30 is shown as having a square tubular cross-section (FIG. 2). This beam has a rearward portion 41 extending between plates 35 and 36 suitably secured or anchored within the stationary support, and has a cantilevered elongated forward portion 42 extending horizontally outwardly from the stationary support through a suitable opening provided in plate 36. At its distal end remote from the stationary support, the cantilevered beam portion 42 is provided with a V-shaped cradle 43 which is adapted to support or hold the rear marginal end portion 23 of the rotor shaft. The stationary support is shown as further including a pair of left and right legs 44, 45 extending out from the sides of the stationary support and resting on the foundation. These legs are arranged to support a portion of the beam behind the stationary support front plate. In order to counterbalance some of the weight of the rotor which will be supported on the cradled outboard end of the beam, the hollow structure of the stationary support contains a weighting filler such as concrete.

Adverting now to FIG. 1, the pedestal support 31 is shown as including a lower horizontal base plate 46 having a plurality of depending rollers 48 secured thereto and resting on a pair of spaced parallel rails 49, 49 arranged parallel to the longitudinal axis of beam 30, an upstanding leg 50, and a plurality of inclined braces 51 suitably connected to leg 50 and base plate 46. Near its upper end, the pedestal support is provided with a V-shaped cradle 52 which is arranged to face and is horizontally aligned with the stationary support cradle 43. The pedestal support cradle 52 is adapted to support the right marginal end portion 24 of the rotor shaft.

Referring now to FIGS. 1, 3, 4, 7 and 8, the carriage 32 is shown as being mounted on rails 49, 49 for selective movement between the two supports. The carriage broadly includes a lower frame 53, and a support structure 57 including an inner frame 54 pivotally mounted on the lower frame, a platform 55 mounted above the inner frame and elevating means 56 arranged to act between the platform and inner frame and selectively operable to raise and lower the platform relative to the inner frame.

As best shown in FIGS. 7 and 8, the lower frame 53 is formed of four lengths of an angle member arranged in a rectangle and suitably secured together. Four rollers 58 are mounted on the underside of the lower frame and operatively engage the rails 49, 49. In this manner the lower frame 53 of carriage 32 is mounted for movement along rails 49, 49.

The inner frame 54 is also constructed of four lengths of an angle member arranged in a rectangle, smaller than that of the lower frame, and suitably secured together. Adjacent its rightward forward end, the inner frame is suitably provided with aligned openings 59 to accommodate passage of a transversely-extending horizontal pivot pin 60 having its marginal end portions (not shown) suitably secured to the lower frame. Thus, the inner frame is mounted on the lower frame for pivotal movement about the axis of pin 60, this axis being horizontal and generally perpendicular to the longitudinal axis of beam 30. At its leftward rear end, the inner frame is provided with another angle member 61 suitably fixed thereto. A plurality of hydraulic actuators 62, two being shown, are mounted on angle member 61 and are arranged to have their extensible rods 63 penetrate openings provided through angle member 61 and engage the lower frame. As best shown in FIG. 3, a foot-operated hydraulic pump 64 containing its own liquid reservoir is mounted on the lower frame and is operatively connected to the actuators 62 to control movement of the same. Thus, if pump 64 may be operated to supply pressurized fluid to the actuators 62, rods 63 will be extended to elevate the rear end of the inner frame. Alternatively, a suitable valve (not shown) associated with pump 64, which may be a commercially available unit, may be operated to release pressurized fluid in actuators 62 to retract rods 63 and cause the rear end of the inner frame to be lowered. Of course, such operation of the actuators 62 will cause pivotal or tilting movement of the inner frame relative to the lower frame about the axis of pivot pin 60. While the hydraulic actuators 62 and pump 64 are preferred, some other suitable mechanical mechanism could be substituted therefor. These actuators 62 constitute selectively operable means for adjusting the position of the inner frame relative to the lower frame.

The platform 55 is shown as including a horizontal rectangular plate-like member 65 provided with a depending perimetrical skirt 66.

Referring now in particular to FIGS. 7 and 8, the elevating means 56 is shown as being a hydraulically-operated scissors-type mechanism. Specifically, the elevating means includes two transversely-spaced pairs of crossed cooperative arms 68, 69 and 68', 69' the arms of each pair being pivotally connected via pivot pin 70 proximate their midpoint so as to form an X-shaped scissors mechanism. The right upper marginal end portions of arms 68, 68' are shown as pivotally mounted on suitable brackets 71 fixed on the underside of the platform, and the left lower marginal end portions of these arms are each shown provided with a freely rotatable roller 72 engaging a horizontal flange of the inner frame. The right lower marginal end portions of arms 69, 69' are shown as being pivotally mounted on suitable brackets 73 fixed on the upper side of the inner frame, and the leftward upper marginal end portions of these arms are each provided with a freely-rotatable roller 74 arranged to engage the planar bottom surface of platform plate 65.

As best shown in FIG. 8, a plurality of hydraulic actuators, specifically four, are operatively interposed between crossed arms 68, 69 and 68', 69'. One pair of such actuators 75, 75' have their cylinder ends suitably pivotally connected to a transverse bar 76 fixed to the lower ends of arms 69, 69'. At their other and rod ends, these actuators 75, 75' are suitably pivotally connected to a transverse bar 77 fixed to arms 68, 68'. The other pair of actuators 78, 78' have their cylinder ends suitably pivotally connected to a transverse bar 79 fixed to the lower ends of arms 68, 68'. At their other and rod ends, these actuators 78, 78' are suitably pivotally connected to a transverse bar 80 fixed to arms 69, 69'.

Actuators 75, 75', 78, 78' are suitably manifolded together so that all receive the same pressurized fluid supplied by a source (not shown) under control of a selectively operable valve (not shown). Such a pressurized hydraulic supply system, with valve control, is well known to those skilled in the art and therefore has not been illustrated specifically. By manipulating such valve to allow pressurized fluid to enter these actuators they will extend to open the scissors mechanism and elevate platform 55 while maintaining parallelism with inner frame 54. On the other hand, manipulating the hydraulic control valve to allow fluid to exhaust from the actuators will permit them to contact and collapse the scissors mechanism, thereby to lower platform 55.

In the preferred embodiment, the carriage further includes a turntable 81 mounted on the platform 55 for rotation about an axis normal to the top plane of support structure 57 and adapted to be selectively rotated by turntable moving means 82. As best shown in FIGS. 6 and 8, the turntable 81 includes a rectangular horizontal plate-like member 83 provided with a depending perimetrical skirt 84, a central bearing 85 acting between the platform and the underside of turntable plate 83, and a plurality of idler rollers 86 pivotally mounted on the turntable plate and adapted to engage the platform. Thus, the turntable is adapted to rotate relative to the platform about the substantially vertical axis of bearing 85.

The turntable moving means 82 includes a ring gear segment 88 (FIG. 6) held between the turntable and platform by means of spacers 89 fixed at their upper ends to the turntable (FIG. 8), and a handwheel 90 journalled in a collar 91 mounted on the platform and having an upper spur gear 92 operatively meshing with ring gear segment 88. Thus, hand wheel 90 may be manually rotated in either angular direction to produce corresponding rotational movement of the turntable relative to the platform.

As best shown in FIG. 6, a plurality of parallel horizontally-elongated cylindrical rollers, severally indicated at 93, are mounted on the turntable. A plane tangential to the crests of these rollers provides the top plane of support structure 57. These rollers, eleven of which are illustrated in FIG. 6, are shown as being normally arranged parallel to the axis of beam 30. Each roller 93 is adapted to rotate about a substantially horizontal shaft having front and rear marginal end portions 94, 95. To accommodate rollers 93, the turntable is shown as further including two longitudinally-spaced transversely-extending front and rear channel members 96, 98 suitably secured to the turntable plate. The upstanding webs of channel members 96, 98 are provided with aligned openings which are adapted to accommodate passage of the roller shaft marginal end portions. In this manner, each roller 93 is mounted on the turntable for rotation about its shaft axis.

The preferred embodiment of carriage 32 is shown as further including roller moving means, generally indicated at 99, which may be operated to cause each roller member to be rotated in the appropriate angular direction to translate an object, such as the stator, across the turntable. As best shown in FIGS. 6 and 7, a sprocket 100 is mounted fast to the forward marginal end portion of every other roller 93, and these sprockets are interconnected by an endless flexible chain 101. Thus, every other roller is coupled to rotate in the same angular direction, with the intermediate rollers being freely rotatable. The roller moving means 99 further includes a hand wheel 102 suitably journalled on a bracket 107 fixed to the turntable and having a first spur gear 103 mounted fast to its shaft, a second idler spur gear 104 also suitably journalled on bracket 107 and arranged to mesh with first spur gear 103, and a third spur gear 105 mounted fast to the rear marginal end portion 95 of the first roller on the right side of the carriage, and arranged to mesh with the second spur gear 104. Thus, handwheel 102 may be rotated in either angular direction to produce corresponding rotation of the first roller via the train of meshing gears 103, 104 and 105. Such rotation of the first roller causes positive cooperative rotation of every other roller via the engagement of endless chain 101 with roller sprockets 100.

Adverting now to FIGS. 1-4, the carriage moving means 33 is shown as including a nut-like member 106 mounted on the carriage, a horizontally-elongated lead screw 108 arranged between and parallel to rails 49, 49, a gear reduction device 109 arranged to rotate one end of the lead screw, and a reversible motor 110 operatively arranged to power device 109. Thus, motor 110 may be suitably selectively operated to cause the lead screw to rotate in either angular direction about its longitudinal axis, this movement causing the carriage to be translated along rails 49, 49 either toward or away from the stationary support.

As best shown in FIG. 5, the carriage moving means 33 may further include a transversely-extending horizontal push bar 111 resiliently mounted on the front face of the stationary support, and associated with a limit switch 112. Push bar 111 is shown as having a generally C-shaped cross-section. The vertical web of push bar 111 is provided with a plurality of horizontal openings 113 which are intended to accommodate passage of the shank portions 114 of suitable bolt-like fasteners having their threaded end portion (not shown) matingly received in tapped holes (not shown) provided in the stationary support, and having their head portions 115 arranged to act on the forward side 116 of the web. A coil spring 118 encircles shank portion 114 and is arranged to act between push bar rear vertical surface 119 and the stationary support upper front plate 36 to bias the push bar to move forwardly toward the pedestal support 31. Push bar 111 is also shown provided with a transversely-extending upwardly and forwardly inclined bearing plate 120 suitably secured to the push bar upper horizontal surface 121. The roller-carrying trip arm 117 of limit switch 112 is arranged to be acted upon by this bearing plate 120, and this switch is operatively arranged in the electrical circuit (not shown) of the conveyor moving means to deactivate the same when the stator displaces the push bar rearwardly. Thus, an operator may operate the carriage moving means to cause the carriage to move rearwardly rapidly toward the stationary support, and subsequent abutment of the push bar 111 by the stator will automatically terminate further rearward movement of the carriage.

Thereafter, selective operation of the carriage moving means will cause the rear face 28 of the stator to engage the vertical coplanar surfaces 122 of abutments or stops 123 which project forwardly from stationary support front plate 36. Three such stops 123 are shown in FIG. 2 as arranged at circumferential intervals about the cantilevered portion 42 of beam 30. Stop surfaces 122 are arranged rearwardly slightly of the front face of push bar 111 even when the latter has tripped arm 117 of limit switch 112 so as to stop the stator just short of engaging these stop surfaces. These surfaces 122 lie in a vertical plane perpendicular to the horizontal axis of beam portion 42. Thus, engagement of the stator with the three stop surfaces will square up the stator with respect to the beam in the sense that the axis of the stator opening 25 will be generally parallel, as viewed from the side or top, with the horizontal axis of beam portion 42.

OPERATION

Figure 13:
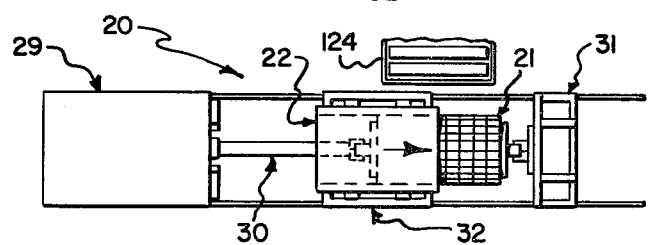
FIG. 13 is a schematic top plan view thereof showing the carriage as being moved away from the stationary support such that the stator will envelop the rotor.
Figure 14:
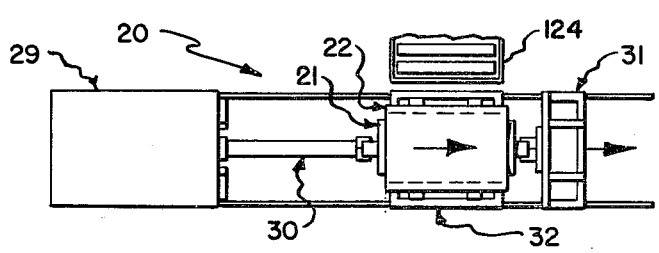
FIG. 14 is a schematic top plan view thereof showing the carriage as having been moved to a position such that the rotor is fully inserted into the stator, and depicting the carriage as thereafter elevated and about to be shifted rightwardly, along with the pedestal support, in order to clear the cradles.
Figure 15:
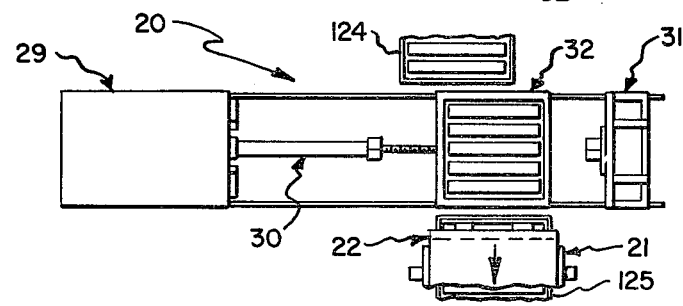
FIG. 15 is a schematic top plan view thereof showing the pedestal support as having been moved away from the beam, showing the carriage also displaced away from the beam to align with an offset downstream conveyor and as having been adjusted in elevation to the height of the downstream conveyor, and showing the rotor-stator assembly as having been moved onto the downstream conveyor.

The operation of the improved apparatus is sequentially illustrated in FIGS. 9–15. In use, the apparatus may be associated with a conveyor having an upstream section 124 and a downstream section 125 which it will be noted from FIG. 15 is offset laterally to the right relative to the upstream section.

Figure 10:
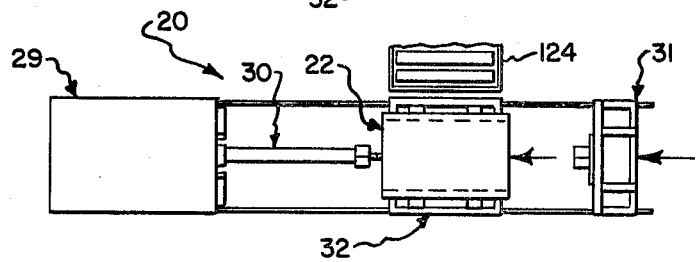
FIG. 10 is a schematic top plan view thereof showing the stator as supported on the carriage which has been lowered and about to be shifted leftwardly, as is also the pedestal support.

In FIG. 9, the carriage 32 is shown as having been moved to a position in line with upstream conveyor 124 to receive a stator 22 delivered thereby. In this position, the carriage rollers 93 are substantially parallel to and at the same height as the rollers of the upstream conveyor. Thus, in this position, the carriage acts as an extension of upstream conveyor 124, and stator 22 may be moved onto the carriage, as shown in FIG. 10.

Figure 11:
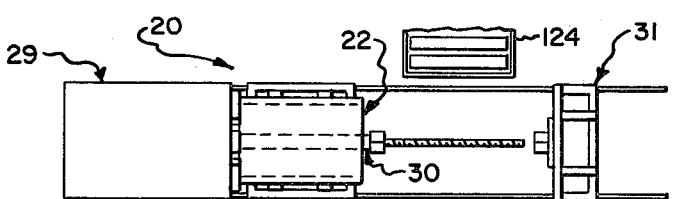
FIG. 11 is a schematic top plan view thereof showing the carriage as having been moved the maximum distance toward the stationary support to square it up relative to this support, with the beam passing through the stator opening, and also showing the pedestal support in a closer position to the beam end.

After the stator has been moved onto the carriage, the carriage elevating means 56 may be suitably operated to lower the support structure 57 to a position at which beam 42 will be generally coaxially aligned with stator opening 25. Thereafter, the carriage moving means 33 may be operated to move the carriage rearwardly toward the stationary support 29. During such rearward movement of the carriage, the beam 42 passes through the stator opening 25 such that its cradle 43 will be exposed, as shown in FIG. 11. Such rearward movement of the carriage will cause the stator rear surface 28 to engage push bar 111 to deactivate the carriage moving means. Subsequent selectively controlled slow rearward movement of the carriage will cause the stator thereon to abut stop surfaces 122 and to do so may shift its position on the carriage rollers 93. Such squaring up of the stator has been depicted in FIG. 11.

Figure 12:
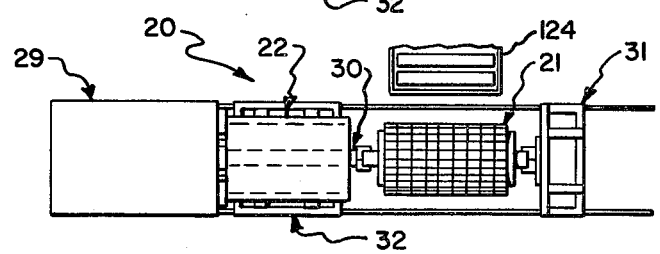
FIG. 12 is a schematic top plan view thereof showing the marginal end portions of the rotor shaft as being supported by the cradles on the beam and the pedestal support after the rotor has been lowered from overhead.

With the distal end of beam 42 exposed beyond the stator, pedestal support 31 is moved toward the stationary support, as depicted accomplished in FIG. 11, and rotor 21 is delivered by an overhead crane, or the like, (not shown) such that the marginal end portions of its shaft will be supported by the support cradles 43 and 52, as shown in FIG. 12.

As shown in FIG. 13, the carriage moving means is then operated to move the carriage away from the stationary support and to cause the stator to envelop the rotor. In this regard, the operator may make whatever adjustments are necessary to align the stator with respect to the rotor. For example, the operator may operate pump 64 to either elevate or depress the rear end of the supported stator, and/or may operate handwheel 90 to rotate the turntable, and/or may operate handwheel 102 to move rollers 93, and/or may operate actuators 75, 75', 78, 78' to raise or lower the stator.

With the rotor thus fully inserted into the stator, as shown in FIG. 14, the support structure 57 of the carriage is carefully elevated. This causes the stator to engage the rotor, by losing the clearance therebetween at the bottom, and lift the rotor off cradles 43 and 52. This has also been depicted as accomplished in FIG. 14, which also suggests the carriage and pedestal support about to be moved rightwardly to free the rotor shaft ends from the cradles 43 and 52.

Rightward motion of the carriage with the rotor and stator assembly thereon is continued until in line with downstream conveyor 125, and rightward movement of the pedestal support is continued farther, all as depicted in FIG. 15. The elevation of the support structure of the carriage is then adjusted so that the rotor and stator assembly can be rolled off onto the downstream conveyor, as has been depicted in FIG. 15.

Farther downstream, the end heads (not shown) for the rotor and stator assembly are suitably mounted.

In this manner, the improved apparatus 10 may be used to insert a rotor into a stator having an opening adapted to receive such rotor.

Therefore, while a preferred embodiment of the inventive apparatus has been shown and described, persons skilled in this art will readily appreciate that various modifications and changes may be made without departing from the spirit of the invention which is defined by the following claims.

What is claimed is:

1. Apparatus for inserting a rotor having a shaft into a stator having an opening adapted to receive said rotor, comprising:
   a stationary support having a cantilevered beam extending outwardly therefrom in a horizontal direction, said beam having on its distal end a cradle for supporting one end of said shaft;
   a pedestal support spaced horizontally from said stationary support and having a cradle aligned with said stationary support cradle for supporting the other end of said shaft; and
   a carriage mounted for movement between said supports and having a platform for supporting said stator such that said beam may penetrate said opening;
   whereby, when said rotor is held by said cradles, said carriage may be moved toward said pedestal support to cause said rotor to be inserted into said stator opening.

2. The apparatus as set forth in claim 1 and further comprising carriage moving means operatively arranged to selectively move said carriage toward and away from said stationary support.

3. The apparatus as set forth in claim 1 wherein said pedestal support is mounted for movement toward and away from said stationary support.

4. The apparatus as set forth in claim 1 wherein said carriage includes a lower frame mounted for movement toward and away from said stationary support, an inner frame mounted on said lower frame for pivotal movement about a transverse axis, and elevating means arranged between said inner frame and platform and selectively operable to raise and lower said platform relative to said inner frame.

5. The apparatus as set forth in claim 4 and further comprising adjusting means operatively arranged between said inner and lower frames to adjust the pivotal position of said inner frame relative to said lower frame.

6. The apparatus as set forth in claim 4 wherein said carriage further includes a turntable mounted on said platform and adapted to support said stator.

7. The apparatus as set forth in claim 6 wherein said carriage further includes turntable moving means arranged between said turntable and platform and selectively operable to rotate said turntable relative to said platform.

8. The apparatus as set forth in claim 6 wherein said turntable includes a plurality of rollers arranged to support said stator, and further comprising roller moving means mounted on said turntable and engaging at least one of said rollers and selectively operable to translate a stator thereacross.

9. The apparatus as set forth in claim 2 and further comprising a push bar mounted on said stationary support and arranged to sense the presence of said stator, said push bar being operatively associated with said carriage moving means to prevent further movement of said carriage toward said stationary support when said push bar senses the presence of said stator.

10. The apparatus as set forth in claim 9 and further comprising stops on said stationary support having coplanar faces perpendicular to the longitudinal axis of said beam as viewed from above and adapted to be abuttingly engaged by said stator to square up said stator relative to said beam.

11. Apparatus for inserting a rotor having a shaft into a stator having an opening adapted to receive said rotor, comprising:
    a stationary support having an elongated cantilevered beam extending horizontally outwardly therefrom, said beam having at its distal end a cradle for supporting one end of said shaft;
    a pedestal support spaced horizontally from said stationary support and having a cradle for supporting the other end of said shaft;
    a carriage arranged for movement between said supports along a line of travel generally parallel to the longitudinal axis of said beam and having a support structure for supporting said stator such that said beam may penetrate said opening;
    selectively operable means arranged to move said carriage along said line;
    selectively operable means arranged to pivot said structure about a horizontal axis transverse to said longitudinal axis;
    selectively operable means arranged to pivot said structure about an axis normal to the top plane of said structure;
    selectively operable means arranged to translate said structure along such normal axis; and
    selectively operable means arranged to effect a change in the position of said stator on said top plane in a direction transverse to said longitudinal axis;
    whereby, when said rotor is supported by said cradles and said stator is supported on said structure, the various said means may be selectively operated to move said carriage toward said pedestal support to cause said rotor to be inserted into said opening while maintaining the desired clearance between said rotor and stator.

* * * * *